3,263,004
PROCESS OF MAKING A SINTERED, HOMOGENEOUS DISPERSION OF NUCLEAR FUEL AND BURNABLE POISON
Charles H. Bean, Naperville, Ill., assignor to the United States of America as represented by the United States Atomic Energy Commission
No Drawing. Filed Oct. 8, 1964, Ser. No. 402,662
8 Claims. (Cl. 264—.5)

This invention described herein was made in the course of, or under, a contract with the United States Atomic Energy Commission.

This invention relates to a process of making a uniform product from a mixture of ceramic materials of different specific weights and in particular with a process of preparing such a product from actinide oxides and comparatively very small quantities of lanthanide rare earth oxides, usually of less than 1% by weight.

Mixtures of lanthanide oxides and actinide oxides of the type just described are of prime importance in the field of nuclear reactors. Actinide oxides are used as the fuel, and oxides of some lanthanides that have a particularly high cross section are incorporated thereinto as a so-called burnable poison. Rare-earth oxides particularly suitable for the purpose of this invention are samarium oxide, europium oxide, dysprosium oxide and gadolinium oxide. They are usually added to a uranium-dioxide-base material, which may or may not contain plutonium dioxide and/or thorium oxide. Fuels of this type must have a high degree of homogeneity so that the chain reactions proceed at a uniform rate throughout the fuel.

Boron oxide has been investigated as burnable poison for the purpose of this invention; however, it has the drawback of volatilizing at the temperatures necessary for compaction or sintering. Oxides of high-neutron-capture-cross-section lanthanides were then investigated for the purpose of this invention; however, a uniform distribution of the very small amount of lanthanide oxide in the considerably greater amount of actinide oxide was practically impossible because of the great difference of densities of the two materials. Separation took place, for instance, even when the powder mixture was poured from one place or container into another. Another factor that favored separation of an oxidic actinide-lanthanide mixture was the difference in particle sizes, the lanthanide oxides usually being considerably finer than the actinide oxides.

It is the principal object of this invention to provide a process for the production of a nuclear oxidic fuel material that contains less than 1% of lanthanide rare-earth oxide as burnable poison in a uniform distribution.

It was found that, when a "master blend" was first prepared that contained the rare-earth oxide in a greater concentration than was desired for the final fuel mixture, homogeneity was obtained and maintained upon sintering. When the sintered master blend was then ground, the powder had a density close to that of the powdered actinide oxide. Therefore, when a small quantity of the master blend was then added to an additional supply of actinide oxide to obtain the desired low concentration of burnable poison, separation did not take place, and a uniform product was again obtained upon compacting.

The process of this invention thus comprises mixing a relatively small quantity of powdered oxide of a high-neutron-capture-cross-section lanthanide rare earth with powdered actinide metal oxide; heating and impact-fusing the mixture thus obtained; cooling the mixture, grinding the mixture, whereby a master blend is obtained; adding a small quantity of said master blend to additional ground actinide oxide; and shaping and compacting the mixture.

For the purpose of this invention, as mentioned, the lanthanide oxides have to be those of high-cross-section rare earths; samarium ($Sm_2O_3$), europium, gadolinium and dysprosium oxides are particularly well suitable. For the preparation of the master blend, a quantity of between 2 and 25% rare-earth oxide is preferably added to the actinide oxide. The actinide oxide has to be a uranium-dioxide-base material which can be used alone or in mixture with plutonium dioxide and/or thorium dioxdie. The powders are thoroughly mixed in devices known in the art, for instance in a ball mill. Impact fusion of the mixture is preferably carried out by pneumatic compaction at a temperature of between 1000 and 1300° C. and a pressure of between 200,000 and 300,000 p.s.i. One of the devices suitable for impact fusion is briefly described on pages 3.1–3.2 of report HW-76300, issued by Hanford Atomic Products Operation in Richland, Washington. The product is cooled and then ground, for instance in a hammer mill and/or a ball mill. Thereafter additional uranium-dioxide-containing material is added to the ground master blend so as to obtain the desired concentration of the rare-earth oxide, which always is below 1% by weight. The precise quantity, of course, is dependent upon the cross section of the specific rare earth and on other nuclear characteristics known to those skilled in the art. For instance, for europium oxide the desired concentration of the final porduct was determined to be 0.158 w/o, while in the case of samarium oxide, $Sm_2O_3$, the concentraiton was calculated as 0.0288 w/o. The final mixture is then again shaped and compacted, which can be done by any known process. For instance, sintering after shaping has given satisfactory results.

*Example*

Two master blends were prepared by mixing samarium sesquioxide powder with uranium dioxide whose specific surface area was about 2 m²/g. One blend contained 2% of the $Sm_2O_3$ and the other one 10%. The mixture was pneumatically impacted, using a pressure of 250,000 p.s.i. and a temperature of 1200° C. Both master blends were ground upon cooling.

Small quantities of both master blends, namely 4.67 grams of the 2-percent blend and 0.92 gram of the 10-percent blend, were then mixed with additional uranium dioxide of the same specific surface area in a quantity to yield 50-gram samples having a final concentration of 1868 p.p.m. of $Sm_2O_3$. The mixture was then shaped into pellets of a diameter of 0.446 inch by pressing at 2200 p.s.i. without adding a binder and fired in a hydrogen atmosphere at between 1650 and 1700° C. for four hours; the pellets had a diameter of 0.365 inch. Both samples were studied photomicrographically and also analyzed chemically and were found to have a very uniform distribution of the samarium oxide in the uranium oxide with a variation of less than 2% of the amount of samarium oxide added.

The sintered pellets had a density of 10.27 g./cm.³, which is above 90% of the theoretical density. There was no evidence of a second phase.

When similar mixtures were prepared without going through the preliminary stage of making a master blend, homogeneity could not be obtained.

It will be understood that the invention is not to be limited to the details given herein but that it may be modified within the scope of the appended claims.

The embodiments of the invention in which an exclusive property or privilege is claimed are defined as follows:

1. A process of making a nuclear fuel consisting of a stable homogeneous dispersion of lanthanide rare-earth oxide in actinide metal oxide in which the former is present in a quantity of less than 1% by weight, said process comprising mixing from 2 to 25 w/o of a powdered oxide of a rare earth that has a high neutron-capture cross section and from 98 to 75% by weight of a powdered uranium-dioxide-base material; impact-fusing the mixture obtained at a pressure of between 200,000 and 300,000 p.s.i. and a temperature of between 1000 and 1300° C.; cooling the product; grinding the product to form a master blend; adding master blend to additional uranium-dioxide-base actinide metal oxide in a quantity to yield a concentration of less than 1% by weight, whereby a fuel mass is obtained; shaping and compacting the fuel mass; and sintering the fuel mass.

2. The process of claim 1 wherein the rare-earth oxide is $Eu_2O_3$.

3. The process of claim 1 wherein the rare-earth oxide is $Sm_2O_3$.

4. The process of claim 1 wherein the rare-earth oxide is $Dy_2O_3$.

5. The process of claim 1 wherein the uranium-dioxide-base material is uranium dioxide.

6. The process of claim 1 wherein the uranium-dioxide-base material is a mixture of uranium dioxide and plutonium dioxide.

7. The process of claim 1 wherein the uranium-dioxide-base material is a mixture of uranium dioxide and thorium dioxide.

8. The process of claim 1 wherein the uranium-dioxide-base material is a mixture of uranium dioxide, plutonium dioxide and thorium dioxide.

References Cited by the Examiner

UNITED STATES PATENTS

| | | |
|---|---|---|
| 2,967,812 | 1/1961 | Thurber. |
| 3,019,176 | 1/1962 | McReynolds et al. |
| 3,169,117 | 2/1965 | Dickinson et al. _____ 252—301.1 |
| 3,194,852 | 7/1965 | Lloyd et al. _____ 264—.5 |
| 3,205,174 | 9/1965 | Wheatley et al. _____ 252—301.1 |
| 3,211,812 | 10/1965 | Johnson et al. _____ 264—.5 |

FOREIGN PATENTS

| | | |
|---|---|---|
| 796,989 | 6/1958 | Great Britain. |
| 818,776 | 8/1959 | Great Britain. |

L. DEWAYNE RUTLEDGE, *Primary Examiner.*